United States Patent
Hayashi et al.

(10) Patent No.: US 12,139,628 B2
(45) Date of Patent: Nov. 12, 2024

(54) ELECTROCONDUCTIVE INKJET INK

(71) Applicant: NORITAKE CO., LIMITED, Nagoya (JP)

(72) Inventors: Hiromichi Hayashi, Nagoya (JP); Ayumi Murakami, Nagoya (JP)

(73) Assignee: NORITAKE CO., LIMITED (JP)

( * ) Notice: Subject to any disclaimer, the term of this patent is extended or adjusted under 35 U.S.C. 154(b) by 331 days.

(21) Appl. No.: 17/435,450

(22) PCT Filed: Feb. 19, 2020

(86) PCT No.: PCT/JP2020/006490
§ 371 (c)(1),
(2) Date: Sep. 1, 2021

(87) PCT Pub. No.: WO2020/184107
PCT Pub. Date: Sep. 17, 2020

(65) Prior Publication Data
US 2022/0056297 A1    Feb. 24, 2022

(30) Foreign Application Priority Data

Mar. 11, 2019   (JP) .................. 2019-044188

(51) Int. Cl.
*C09D 11/52*    (2014.01)
*C09D 11/033*   (2014.01)
(Continued)

(52) U.S. Cl.
CPC ............ *C09D 11/52* (2013.01); *C09D 11/033* (2013.01); *C09D 11/037* (2013.01);
(Continued)

(58) Field of Classification Search
CPC .................................................. C09D 11/52
See application file for complete search history.

(56) References Cited

U.S. PATENT DOCUMENTS 6,156,433 A * 12/2000 Hatori ............... H01J 9/14
430/311
2004/0157078 A1   8/2004 Yoshida
(Continued)

FOREIGN PATENT DOCUMENTS

| CN | 102361835 | 2/2012 |
|---|---|---|
| CN | 103124766 | 5/2013 |

(Continued)

OTHER PUBLICATIONS

Hayashi, Hiromichi; International Preliminary Report on Patentability for PCT/JP2020/006490, filed Feb. 19, 2020, mailed Aug. 25, 2021, 11 pgs.

(Continued)

*Primary Examiner* — William D Young
(74) *Attorney, Agent, or Firm* — Taylor English Duma LLP

(57) ABSTRACT

The electroconductive inkjet ink disclosed herein contains at least inorganic powder containing high melting point metal particles, a dispersant, an organic solvent, and a poly(vinyl acetal) resin. In the electroconductive ink, the inorganic powder has an average primary particle diameter of 500 nm or less, a volume ratio of the inorganic powder is 7.5% by volume or lower, the ratio ($S_f/V_D$) of the specific surface area of the inorganic powder with respect to the volume of the dispersant is 0.25 or higher and 10 or lower, the poly(vinyl acetal) resin has an average molecular weight of $2.5 \times 10^4$ or larger and $6.4 \times 10^4$ or smaller, and the ratio ($W_{PA}/W_S$) of the weight of the poly(vinyl acetal) resin with respect to the weight of the organic solvent is 0.5% by weight or higher and 3% by weight or lower.

11 Claims, 4 Drawing Sheets

(51) Int. Cl.
*C09D 11/037* (2014.01)
*C09D 11/106* (2014.01)
*C09D 11/322* (2014.01)
*C09D 11/36* (2014.01)
*H01B 1/22* (2006.01)

(52) U.S. Cl.
CPC .......... *C09D 11/106* (2013.01); *C09D 11/322* (2013.01); *C09D 11/36* (2013.01); *H01B 1/22* (2013.01)

(56) References Cited

U.S. PATENT DOCUMENTS

| | | |
|---|---|---|
| 2007/0051927 A1 | 3/2007 | Itoh et al. |
| 2008/0193667 A1 | 8/2008 | Garbar et al. |
| 2011/0154660 A1* | 6/2011 | Kim .................... H01G 4/0085 252/512 |
| 2012/0041123 A1 | 2/2012 | Ootsuki et al. |
| 2012/0162855 A1* | 6/2012 | Suh .......................... H01B 1/22 977/779 |
| 2013/0225741 A1 | 8/2013 | Ootsuki |
| 2017/0037271 A1 | 2/2017 | Kobayashi et al. |

FOREIGN PATENT DOCUMENTS

| | | |
|---|---|---|
| CN | 105900196 | 8/2016 |
| JP | 2008513565 | 5/2008 |
| JP | 2012119132 | 6/2012 |
| JP | 2012216425 | 11/2012 |
| JP | 2015062871 | 4/2015 |
| JP | 2016188419 | 11/2016 |
| WO | 2005037465 | 4/2005 |

OTHER PUBLICATIONS

Hayashi, Hiromichi; International Search Report and Written Opinion for PCT/JP2020/006490, filed Feb. 19, 2020, mailed May 19, 2020, 12 pgs.

Noritake Co., Limited; Office Action for Chinese patent application No. 202080019986.0, mailed Oct. 10, 2022, 9 pgs.

* cited by examiner

ELECTROCONDUCTIVE INKJET INK

TECHNICAL FIELD

The present invention relates to electroconductive inkjet ink, and specifically, electroconductive inkjet ink that is usable to produce an electronic component. The present application claims priority based upon Japanese Patent Application No. 2019-044188 filed on Mar. 11, 2019, the entirety of which is incorporated herein by reference.

BACKGROUND ART

Inkjet printing has conventionally been used as one of printing methods to draw a desired image such as a pattern, a letter or the like on a printing target. Such inkjet printing allows a highly precise image to be drawn at low cost and on demand and does not cause much damage to the printing target, and therefore, use thereof in various fields is now being studied. For example, it has recently been studied to use the inkjet printing to form an electroconductive circuit pattern (electrode, etc.) during production of an electronic component.

In order to produce an electronic component, electroconductive inkjet ink (hereinafter, referred to also as "electroconductive ink") into which inorganic powder containing metal particles or the like is incorporated as an electroconductive material is used. As an example of such electroconductive ink, Patent Literature 1 discloses ink containing nanometal powder of silver, a silver and copper alloy or the like. Patent Literature 2 discloses ink containing microparticles of a metal oxide such as silver oxide, copper oxide, palladium oxide, nickel oxide, lead oxide, cobalt oxide or the like. In order to perform inkjet printing appropriately, it is generally required that the electroconductive ink should have a low viscosity and a high concentration of inorganic powder. Patent Literature 1 and Patent Literature 2 mentioned above each propose a technology usable to perform inkjet printing appropriately.

Electroconductive inkjet ink is also required to stably disperse the inorganic powder from the point of view of guaranteeing a high ease of ejection at the time of printing, a high electroconductivity after the printing, and the like. For example, Patent Literature 3 discloses a technology of incorporating a first dispersant containing either one of an acid anchoring group and a base anchoring group and a second dispersant containing both of an acid anchoring group and a base anchoring group in order to improve the dispersibility of solid microparticles (inorganic powder) having acid points and base points in a mixed state at a surface thereof.

CITATION LIST

Patent Literature

Patent Literature 1: PCT Japanese National Phase Laid-Open Patent Publication No. 2008-513565
Patent Literature 2: Japanese Laid-Open Patent Publication No. 2012-216425
Patent Literature 3: Japanese Laid-Open Patent Publication No. 2015-62871

SUMMARY OF INVENTION

Technical Problem

Some electronic components (e.g., electrostatic chuck and the like) are required to have a plasma durability. Such a plasma-durable electronic component includes a substrate formed of a ceramic material such as alumina, aluminum nitride or the like. In a production process of the plasma-durable electronic component, an inorganic substrate containing a ceramic material is fired at a high temperature of 1200° C. or higher to be sintered. For an electroconductive material of the plasma-durable electronic component, particles of a metal material having a melting point of 1200° C. or higher (hereinafter, referred to also as "high melting point metal particles") such as tungsten (W), palladium (Pd), platinum (Pt), molybdenum (Mo), cobalt (Co), nickel (Ni), iron (Fe), chromium (Cr) or the like are used in order to maintain the shape of the electroconductive circuit pattern during the firing performed at a high temperature.

The present inventors are studying forming an electroconductive circuit pattern of the above-described plasma-durable electronic component by inkjet printing. However, the high melting point metal particles having a melting point of 1200° C. or higher have a nature of causing sedimentation or condensation in a liquid more easily than general metal particles formed of Ag, Cu or the like. Therefore, the electroconductive ink containing high melting point metal particles are difficult to be kept at a low ink viscosity for a long time and had room for improvement in the ease of ejection and the long-term stability.

The present invention, made in light of such a point, has a main object of providing a technology that improves the ease of ejection of electroconductive ink containing high melting point metal particles from an inkjet device and allows the electroconductive ink to keep preferred ease of ejection for a long time.

Solution to Problem

The electroconductive inkjet ink disclosed herein is usable to produce an electronic component. Such electroconductive inkjet ink contains at least inorganic powder containing metal particles having a melting point of 1200° C. or higher, a dispersant, an organic solvent, and a poly(vinyl acetal) resin. In the electroconductive inkjet ink, the inorganic powder has an average primary particle diameter of 500 nm or less, a volume ratio of the inorganic powder is 7.5% by volume or lower with respect to 100% by volume as the total volume of the inkjet ink, and the ratio ($S_I/V_D$) of the specific surface area ($S_I$) of the inorganic powder with respect to the volume ($V_D$) of the dispersant where the total volume of the inkjet ink is 100% by volume is 0.25 or higher and 10 or lower. In the electroconductive inkjet ink disclosed herein, the poly(vinyl acetal) resin has an average molecular weight of $2.5 \times 10^4$ or larger and $6.4 \times 10^4$ or smaller, and the ratio ($W_{PA}/W_S$) of the weight ($W_{PA}$) of the poly(vinyl acetal) resin with respect to the weight ($W_S$) of the organic solvent is 0.5% by weight or higher and 3% by weight or lower.

The electroconductive ink disclosed herein contains at least the inorganic powder, the dispersant, the organic solvent, and the poly(vinyl acetate) resin. It has been confirmed by experiments performed by the present inventors that electroconductive ink having a high ease of ejection and a high long-term stability can be prepared by mixing these materials under appropriate conditions. Therefore, the electroconductive ink disclosed herein allows a plasma-durable electronic component (electrostatic chuck, etc.) to be produced by use of an inkjet device.

In a preferred embodiment of the electroconductive inkjet ink disclosed herein, the average primary particle diameter of the inorganic powder is 150 nm or more. With this arrangement, the inorganic powder can be suppressed from being condensed and thus a decrease in the ease of ejection can be suppressed.

In a preferred embodiment of the electroconductive inkjet ink disclosed herein, a volume ratio of the inorganic powder is 1.5% by volume or higher with respect to 100% by volume as the total volume of the inkjet ink. With this arrangement, an electroconductive circuit pattern having a preferred thickness can be formed with a smaller number of times of printing. This can contribute to improvement in the production efficiency of electronic components.

In a preferred embodiment of the electroconductive inkjet ink disclosed herein, the metal particles contain at least one element selected from the group consisting of W, Co, Ni, Fe, Pt, Cr, Pd and Mo. These metal particles are especially high in the heat resistance (melting point: 1400° C. or higher), and therefore, are preferably usable to produce a plasma-durable electronic component.

In a preferred embodiment of the electroconductive inkjet ink disclosed herein, the poly(vinyl acetal) resin is a poly (vinyl butyral) resin and/or a poly(vinyl formal) resin. Incorporation of such a resin material as the poly(vinyl acetal) resin allows the precipitation of the inorganic powder to be suppressed appropriately and thus can improve the ease of ejection and the long-term stability preferably.

In a preferred embodiment of the electroconductive inkjet ink disclosed herein, a weight ratio of the metal particles is 50% by weight or higher with respect to 100% by weight as the total weight of the inorganic powder. The inorganic powder in the electroconductive ink disclosed herein may contain inorganic particles other than the high melting point metal particles (may contain, for example, ceramic particles). It should be noted that from the point of view of preferably guaranteeing that the post-firing electroconductive circuit pattern is sufficiently electroconductive, it is preferred that a content (% by weight) of the high melting point metal particles in the inorganic powder is set to 50% by weight or higher.

DESCRIPTION OF EMBODIMENTS

Hereinafter, preferred embodiments of the present invention will be described. Elements that are other than the elements specifically referred to in this specification and are necessary to carry out the present invention can be understood as a matter of design based on the prior art and known to a person of ordinary skill in the art. The present invention can be carried out based on the contents disclosed in this specification and the technological common knowledge in the art.

1. Electroconductive Inkjet Ink

Electroconductive ink disclosed herein contains at least (a) inorganic powder, a (b) dispersant, an (c) organic solvent, and a (d) poly(vinyl acetal) resin. It has been confirmed by experiments performed by the present inventors that electroconductive ink having a high ease of ejection and a high long-term stability can be prepared by mixing the materials (a) through (d) under appropriate conditions.

Figure 1:
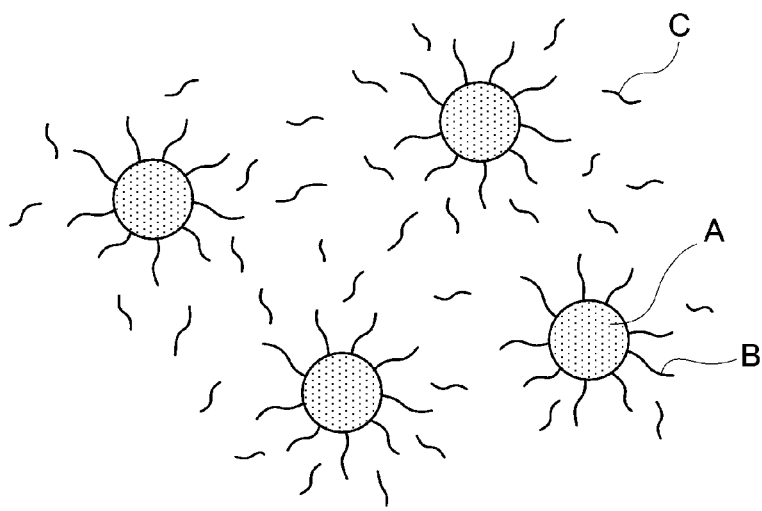
FIG. 1 is a schematic view showing a state of inorganic powder in electroconductive ink.

As shown in FIG. 1, in electroconductive ink containing the materials (a) through (d), a dispersant B adheres to a surface of each of metal particles A, and therefore, it is expected that the metal particles A are suppressed from being condensed although the electroconductive ink is not interpreted in a limited manner as working like this. In addition, a poly(vinyl acetal) resin C is dispersed in an organic solvent, and therefore, it is expected that the metal particles A are suppressed from being precipitated.

However, when the present inventors actually performed experiments, both of the ease of ejection and the long-term stability were not kept high by merely incorporating the (b) dispersant and the (c) poly(vinyl acetal) resin, and thus electroconductive ink usable to produce an electronic component was not obtained. As a result of performing various experiments and studies in repetition, the present inventors have found out that various conditions need to be satisfied in order to allow a condensation suppressing effect provided by the (b) dispersant and a precipitation suppressing effect provided by the (d) poly(vinyl acetal) resin to be exhibited appropriately.

Hereinafter, the details of the materials (a) through (d) mentioned above and the conditions under which the effects provided by the (d) dispersant and the (d) poly(vinyl acetal) resin are exhibited appropriately will be described.

(a) Inorganic Powder

Inorganic powder is a material that forms a main component of a post-firing printing layer (electroconductive circuit pattern). In order to provide the post-firing printing layer with electroconductivity, the electroconductive ink disclosed herein contains metal particles in the inorganic powder. The metal particles are high melting point metal particles containing a metal element having a melting point of 1200° C. or higher. Use of such high melting point metal particles allows the shape of the electroconductive circuit pattern to be maintained even when the electroconductive circuit pattern is exposed to a high temperature environment. Therefore, a plasma-durable electronic component (electrostatic chuck, etc.) to be fired at a high temperature can be produced preferably. Preferred examples of such a high melting point metal material include W, Co, Ni, Fe, Pt, Cr, Pd, Mo, and the like. These metal elements are especially high in the heat resistance (melting point: 1400° C. or higher), and therefore, are especially preferably usable to produce a plasma-durable electronic component. Among the above-listed high melting point metal materials, W, Pt, Pd and Mo are especially high in the heat resistance (melting point: 1500° C. or higher). However, these high melting point metal materials have a very high specific gravity (specific gravity: 10 or higher), and therefore, are easily decreased in the ease of ejection and the long-term stability by precipitation. Nonetheless, the technology disclosed herein allows the condensation suppressing effect and the precipitation suppressing effect described above to be exhibited appropriately, and therefore, allows the electroconductive ink containing a high melting point metal material having a high specific gravity such as W, Pt or the like to be used stably.

The inorganic powder may contain inorganic particles other than the high melting point metal particles as long as the effect of the technology disclosed herein is not inhibited. Examples of such inorganic particles include particles of a ceramic material such as $ZrO_2$, $Al_2O_3$, $Ag_2O$, $Cu_2O$, PdO, NiO, CoO or the like. These ceramic particles have a melting point higher than that of general metal particles, and therefore, can improve the heat resistance of a printed electroconductive circuit pattern by being mixed with the high melting point metal particles. In the case where inorganic particles such as ceramic particles or the like are to be incorporated, it is preferred that the content of the high melting point metal particles is 50% by weight or higher with respect to 100% by weight, which is the total weight of the inorganic powder. With such an arrangement, both of the electroconductivity and the heat resistance of the electroconductive circuit pattern can be kept high.

The average primary particle diameter of the inorganic powder of the electroconductive ink disclosed herein is one of factors that can influence the ease of ejection and the long-term stability. Specifically, in the case where the average primary particle diameter of the inorganic powder is too long, the precipitation suppressing effect provided by the poly(vinyl acetal) resin is not exhibited appropriately, and thus the long-term stability may be decreased. Even if the condensation suppressing effect provided by the dispersant is exhibited, if the primary particle diameter itself of the inorganic powder is too long, the ejection opening of the inkjet device may undesirably be clogged to decrease the ease of ejection. Based on these points, the inorganic powder of the electroconductive ink disclosed herein is set to have an average primary particle diameter of 500 nm or less. From the point of view of providing higher ease of ejection and higher long-term stability, the average primary particle diameter of the inorganic powder is preferably 475 nm or less, more preferably 450 nm or less, still more preferably 425 nm or less, and especially preferably 400 nm or less.

By contrast, there is a tendency that as the average primary particle diameter is decreased, the inorganic powder is more easily condensed. Therefore, the average primary particle diameter of the inorganic powder is preferably 150 nm or more, more preferably 170 nm or more, still more preferably 180 nm or more, and especially preferably 200 nm or more.

In this specification, the "average primary particle diameter" is a value measured based on an image obtained by an observation performed by use of an SEM (scanning electron microscope). Specifically, from an SEM image of the electroconductive ink, 100 primary particles of the inorganic powder are randomly selected, and the average particle diameter of the selected particles is set as the average particle diameter.

In addition, in the electroconductive ink disclosed herein, the content of the inorganic powder is also one of the factors that can influence the ease of ejection and the long-term stability and is adjusted to a value in a predetermined range. Specifically, in the case where the content of the inorganic powder is too high, even if the condensation suppressing effect provided by the dispersant and the precipitation suppressing effect provided by the poly(vinyl acetal) resin are exhibited, neither the condensation nor the precipitation of the inorganic powder can be sufficiently prevented, and thus the ease of ejection and the long-term stability are decreased. Therefore, in the electroconductive ink disclosed herein, a volume ratio of the inorganic powder is set to 7.5% by volume or lower with respect to 100% by volume, which is the total volume of the ink. From the point of view of preventing the decrease in the ease of ejection and the long-term stability more preferably, the volume of the inorganic powder material is preferably 7% by volume or lower, more preferably 6.5% by volume or lower, still more preferably 6% by volume or lower, and especially preferably 5.5% by volume or lower.

By contrast, from the point of view of forming an electroconductive circuit pattern having a preferred thickness with a smaller number of times of printing, it is preferred that the content of the inorganic powder is higher. From this point of view, the volume of the inorganic powder material is preferably 1% by volume or higher, more preferably 1.5% by volume or higher, still more preferably 2% by volume or higher, and especially preferably 3% by volume or higher.

As described below in detail, in the electroconductive ink disclosed herein, the ratio of the specific surface area ($S_f$) of the inorganic powder with respect to the volume ($V_D$) of the dispersant, namely ($S_f/V_D$), is set to a value in a predetermined range in order to allow the condensation suppressing effect provided by the dispersant to be exhibited appropriately. It should be noted that as long as the ratio $S_f/V_D$ satisfies the predetermined range, the specific surface area ($S_f$) itself of the inorganic powder is not specifically limited to any value and may be adjusted to a desired value suitably. For example, the specific surface area ($S_f$) of the inorganic powder may be 0.5 $m^2/g$ or larger, 1 $m^2/g$ or larger, 1.5 $m^2/g$ or larger, or 2 $m^2/g$ or larger. The specific surface area ($S_f$) of the inorganic powder may be 8 $m^2/g$ or smaller, 7.5 $m^2/g$ or smaller, 7 $m^2/g$ or smaller, or 6.5 $m^2/g$ or smaller.

(b) Dispersant

The electroconductive ink disclosed herein contains a dispersant. A preferred dispersant forms steric effects by macromolecule adsorption to the inorganic powder to exhibit a preferred condensation suppressing effect. Preferred examples of such a dispersant include a cation-based dispersant, an anion-based dispersant and the like. A cation-based dispersant adheres to a surface of inorganic powder (preferably, metal particles) efficiently by an acid-base reaction. An example of the cation-based dispersant is an amine-based dispersant. Such a dispersant appropriately selected can suppress the condensation of the inorganic powder more preferably by steric effects and can also contribute to improvement in the long-term stability of the ink. Preferred examples of the amine-based dispersant include a fatty acid amine-based dispersant, a polyesteramine-based dispersant and the like having an average molecular weight of $1\times10^3$ or larger and $5\times10^4$ or smaller (e.g., about $1\times10^4$).

As described above, in the electroconductive ink disclosed herein, the ratio ($S_f/V_D$) of the specific surface area ($S_f$) of the inorganic powder with respect to the volume ($V_D$) of the dispersant is set to a value in a predetermined range in order to allow the condensation suppressing effect provided by the dispersant to be exhibited appropriately. Specifically, the dispersant in the electroconductive ink disclosed herein exhibits the condensation suppressing effect by adhering to the surface of each of particles of the inorganic powder. The present inventors consider that in order to allow the condensation suppressing effect to be exhibited appropriately, a sufficient amount of dispersant needs to be incorporated with respect to the specific surface area ($S_f$) of the inorganic powder and set the ratio $S_f/V_D$ to 10 or lower. With such an arrangement, the dispersant is incorporated in an amount to sufficiently cover the surface of each of the particles of the inorganic powder, and therefore, can exhibit the condensation suppressing effect appropriately to provide a high level of ease of ejection. From the point of view of allowing the condensation suppressing effect to be exhibited more preferably, the ratio $S_f/V_D$ mentioned above is preferably 9 or lower, more preferably 8.5 or lower, still more preferably 8 or lower, and especially preferably 7.5 or lower.

By contrast, the present inventors consider that if the content of the dispersant with respect to the specific surface area ($S_f$) of the inorganic powder is too high, a part of the dispersant does not adhere to the surface of the particles of the inorganic powder (an extra part of the dispersant is generated), and therefore, the ease of ejection may undesirably be decreased. Thus, the present inventors set the ratio $S_f/V_D$ to 0.25 or higher. From the point of view of preventing, more preferably, the ease of ejection from being decreased by such an extra part of the dispersant, the ratio $S_f/V_D$ mentioned above is preferably 0.3 or higher, more preferably 0.4 or higher, still more preferably 0.7 or higher, and especially preferably 1 or higher.

Like in the case of the specific surface area ($S_f$) of the inorganic powder described above, as long as the ratio $S_f/V_D$ satisfies the range of 0.25 or higher and 10 or lower, the volume ($V_D$) itself of the dispersant is not specifically limited to any value. For example, the volume ($V_D$) of the dispersant may be 0.1% by volume or higher, 0.2% by volume or higher, 0.4% by volume or higher, or 0.6% by volume or higher. The volume ($V_D$) of the dispersant may be 20% by volume or lower, 15% by volume or lower, 10% by volume or lower, or 7.5% by volume or lower.

(c) Organic Solvent

The electroconductive ink disclosed herein contains an organic solvent. The organic solvent merely needs to be able of disperse the inorganic powder and the poly(vinyl acetal) resin appropriately, and any organic solvent usable for the conventional inkjet ink is usable with no specific limitation. In consideration of the ease of ejection and the long-term stability of the ink, an organic solvent having a low viscosity and a high melting point is usable especially preferably. Preferred examples of such an organic solvent include glycol acetate, aliphatic monoalcohol, and the like. Examples of the glycol acetate include ethyleneglycolmonomethylether acetate, ethyleneglycolmonoethylether acetate, ethyleneglycolmonobutylether acetate, diethyleneglycolmonomethylether acetate, diethyleneglycolmonoethylether acetate, diethyleneglycolmonobutylether acetate, propyleneglycolmonomethylether acetate, propyleneglycolmonoethylether acetate, propyleneglycolmonobutylether acetate, dipropyleneglycolmonomethylether acetate, butylglycol acetate, dibutylglycol acetate, and the like. Examples of the aliphatic monoalcohol include straight-chain aliphatic alcohol and branched aliphatic alcohol such as methanol, ethanol, propanol, isopropanol, butanol, n-amylalcohol, hexanol, heptanol, n-octanol, 2-ethylhexanol, isooctanol, nonanol, decanol, isoundecanol, lauryl alcohol, cetyl alcohol, stearyl alcohol, and the like.

(d) Poly(Vinyl Acetal) Resin

The electroconductive ink disclosed herein contains a poly(vinyl acetal) resin. As described above, the poly(vinyl acetal) resin has a function of being dispersed in the organic solvent to suppress the precipitation of the inorganic powder. The poly(vinyl acetal) resin encompasses resins generated by acetalizing a poly(vinyl alcohol) resin. Examples of such a poly(vinyl acetal) resin include a poly(vinyl butyral) resin, a poly(vinyl formal) resin (vinylon), and the like.

In the electroconductive ink disclosed herein, the average molecular weight of the poly(vinyl acetal) resin is set to a value in a predetermined range in order to allow the precipitation suppressing effect provided by the poly(vinyl acetal) resin to be exhibited appropriately. Specifically, if the average molecular weight of the poly(vinyl acetal) resin is too small, the resin cannot inhibit the sedimentation of the inorganic powder, and thus the long-term stability may undesirably be decreased significantly. Therefore, in the electroconductive ink disclosed herein, the average molecular weight of the poly(vinyl acetal) resin is set to $2.5 \times 10^4$ or larger. From the point of view of allowing the precipitation suppressing effect to be exhibited more preferably, the average molecular weight is preferably $3 \times 10^4$ or larger, more preferably $3.2 \times 10^4$ or larger, still more preferably $3.6 \times 10^4$ or larger, and especially preferably $4 \times 10^4$ or larger.

By contrast, if the average molecular weight of the poly(vinyl acetal) resin is too large, the viscosity of the organic solvent may undesirably be increased to decrease the ease of ejection. Therefore, in the electroconductive ink disclosed herein, the average molecular weight of the poly(vinyl acetal) resin is set to $6.4 \times 10^4$ or smaller. From the point of view of guaranteeing a preferred ease of ejection, the average molecular weight is preferably $6.2 \times 10^4$ or smaller, more preferably $6 \times 10^4$ or smaller, still more preferably $5.8 \times 10^4$ or smaller, and especially preferably $5.6 \times 10^4$ or smaller.

In the electroconductive ink disclosed herein, the ratio of the weight ($W_{P4}$) of the poly(vinyl acetal) resin with respect to the weight ($W_S$) of the organic solvent, namely ($W_{P4}/W_S$), is set to a value in a predetermined range in order to allow the precipitation suppressing effect provided by the poly(vinyl acetal) resin to be exhibited appropriately. Specifically, in order to allow the precipitation suppressing effect to be exhibited appropriately and thus improve the long-term stability, it is required that the poly(vinyl acetal) resin of a sufficient amount is dispersed in the organic solvent. From this point of view, in the electroconductive ink disclosed herein, the ratio ($W_{P4}/W_S$) of the weight ($W_{P4}$) of the poly(vinyl acetal) resin with respect to the weight ($W_S$) of the organic solvent is set to 0.5% by weight or higher. From the point of view of allowing the precipitation suppressing effect to be exhibited more preferably, the ratio $W_{P4}/W_S$ is preferably 0.6% by weight or higher, more preferably 0.7% by weight or higher, still more preferably 0.8% by weight or higher, and especially preferably 1% by weight or higher. The content ($W_{P4}$) of the poly(vinyl acetal) resin can also influence the fixing strength to the surface of the inorganic powder. It has been confirmed by the experiments performed by the present inventors that a sufficient fixing strength is obtained by setting the ratio $W_{P4}/W_S$ to 0.5% by weight or higher.

By contrast, if the amount of the poly(vinyl acetal) resin dispersed in the organic solvent is too large, the viscosity of the electroconductive ink is increased to decrease the ease of ejection. Therefore, in the electroconductive ink disclosed herein, the ratio $W_{P4}/W_S$ is set to 3% by weight or lower. From the point of view of guaranteeing a more preferred ease of ejection, the ratio $W_{P4}/W_S$ is preferably 2.75% by weight or lower, more preferably 2.5% by weight or lower, still more preferably 2.25% by weight or lower, and especially preferably 2% by weight or lower.

(e) Other Components

The electroconductive ink disclosed herein may contain a known additive usable for inkjet ink (typically, inkjet ink for an inorganic substrate) when necessary, as long as the effect of the present invention is not spoiled. The type of such an additive may be changed suitably in accordance with the purpose and does not characterize the present invention, and therefore, will not be described herein in detail.

2. Preparation of Electroconductive Ink

Figure 2:
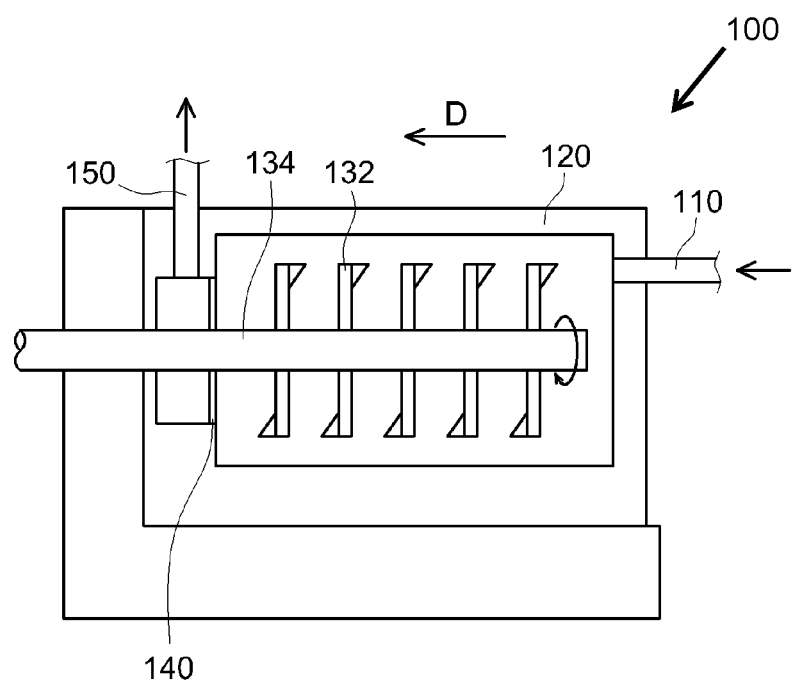
FIG. 2 is a cross-sectional view schematically showing a stirring and pulverization device usable to produce electroconductive ink.

Now, a procedure for preparing (producing) the electroconductive ink disclosed herein will be described. The electroconductive ink disclosed herein may be prepared by mixing the materials (a) through (d) under the conditions under which the condensation suppressing effect and the precipitation suppressing effect are exhibited, and then grinding and dispersing the inorganic powder. FIG. 2 is a cross-sectional view schematically showing a stirring and pulverization device usable to produce the electroconductive ink. The following description is not intended to limit the electroconductive ink disclosed herein.

For producing the electroconductive ink disclosed herein, first, the above-described materials (a) through (d) are weighed and mixed to prepare a slurry, which is a precursor of the ink. In this step, the materials to be mixed are adjusted such that the "volume of the inorganic powder", the "ratio $(S_f/V_D)$ of the specific surface area of the inorganic powder with respect to the volume of the dispersant", the "average molecular weight of the poly(vinyl acetal) resin" and the "ratio $(W_{P4}/W_S)$ of the weight of the poly(vinyl acetal) resin with respect to the weight of the organic solvent" are each a desired value.

Next, a stirring and pulverization device 100 as shown in FIG. 2 is used to stir the slurry and pulverize the inorganic powder. Specifically, pulverizing beads (e.g., zirconia beads each having a diameter of 0.5 mm) are incorporated into the above-mentioned slurry, and then the slurry is supplied into a stirring container 120 from a supply opening 110. The stirring container 120 accommodates a shaft 134 having a plurality of stirring blades 132. One end of the shaft 134 is attached to a motor (not shown). The motor is driven to rotate the shaft 134, so that the slurry is stirred while being fed downstream with respect to a liquid feeding direction D by the plurality of stirring blades 132. During the stirring, the inorganic powder containing the metal particles or the like is pulverized by the pulverizing beads incorporated into the slurry, and the inorganic powder in the form of microscopic particles is dispersed into the slurry.

The slurry reaching the downstream side with respect to the liquid feeding direction D passes a filter 140. As a result, the pulverizing beads and a portion of the inorganic powder that was not formed into the microscopic particles are collected by the filter 140, and the electroconductive ink in which the inorganic powder in the form of the microscopic particles is sufficiently dispersed is discharged from a discharge opening 150. Pore diameters of the filter 140 can be adjusted to adjust the "average primary particle diameter of the inorganic powder" in the electroconductive ink to a value in a desired range.

The electroconductive ink thus obtained has the various conditions adjusted such that the condensation suppressing effect and the precipitation suppressing effect are exhibited appropriately, and therefore, can have a high level of ease of ejection and a high level of long-term stability although containing a high melting point metal material having a melting point of 1200° C. or higher.

3. Use of the Electroconductive Ink

Now, the use of the electroconductive ink disclosed herein will be described. The electroconductive ink disclosed herein is used to produce an electronic component. In this specification, the expression "used to produce an electronic component" can encompass a form in which the electroconductive ink disclosed herein is caused to directly adhere to a surface of an inorganic substrate and also a form in which the electroconductive ink disclosed herein is caused to adhere to a surface of an inorganic substrate indirectly via an intermediate member such as a transfer paper sheet or the like.

(1) Printing

Figure 3:
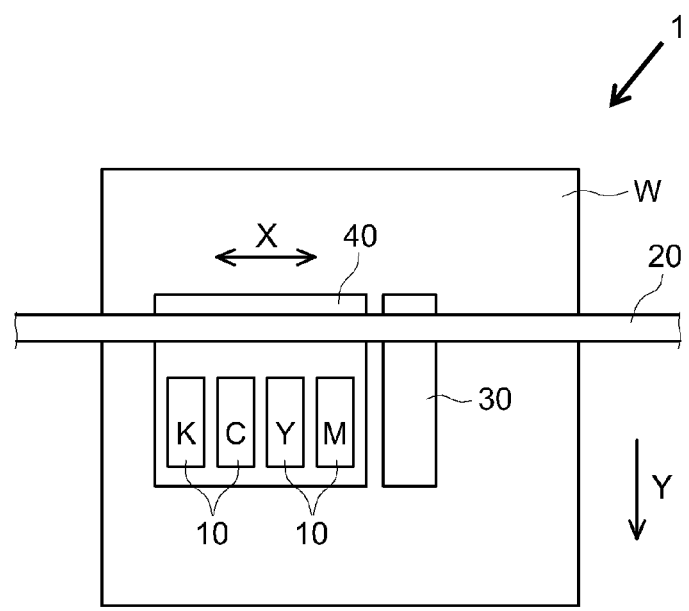
FIG. 3 is an overall view schematically showing an example of inkjet device.
Figure 4:
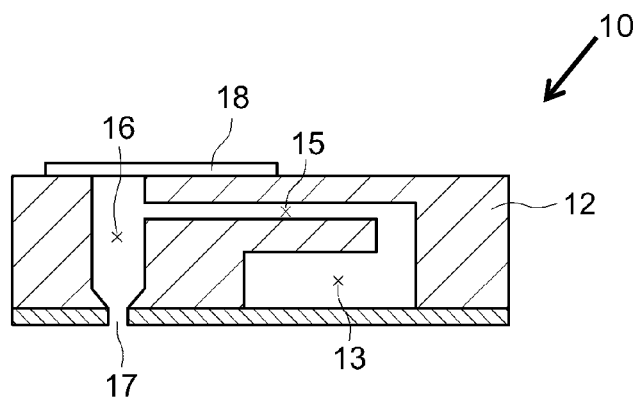
FIG. 4 is a cross-sectional view schematically showing an inkjet head in the inkjet device shown in FIG. 3.

FIG. 3 is an overall view schematically showing an example of inkjet device. FIG. 4 is a cross-sectional view schematically showing an inkjet head in the inkjet device shown in FIG. 3.

The electroconductive ink disclosed herein is printed on a surface of a printing target by an inkjet device 1 as shown in FIG. 3. An inorganic substrate W as the printing target is not limited to any specific inorganic substrate, and any inorganic substrate usable as a substrate of a general electronic component is usable with no specific limitation. The electroconductive ink disclosed herein contains a high melting point metal material in the inorganic powder, and therefore, is especially preferably usable for an inorganic substrate W formed of alumina or aluminum nitride, which is to be fired at a high temperature of 1200° C. or higher.

A structure of the inkjet device 1 shown in FIG. 3 will be described. The inkjet device 1 includes inkjet heads 10 storing the electroconductive ink. The inkjet heads 10 are accommodated in a printing cartridge 40. The printing cartridge 40 is outserted over a guide shaft 20, and is structured to move in a reciprocating manner along an axial direction X of the guide shaft 20. Although not shown, the inkjet device 1 includes a moving mechanism that moves the guide shaft 20 in a vertical direction Y. With such a structure, the inkjet device 1 can eject the electroconductive ink to a desired position on the inorganic substrate W.

The inkjet heads 10 shown in FIG. 3 are each, for example, a piezo-type inkjet head as shown in FIG. 4. The piezo-type inkjet head 10 includes a storage portion 13, storing the ink, provided in a case 12. The storage portion 13 is in communication with an ejection portion 16 via a liquid feeding path 15. The ejection portion 16 has an ejection opening 17 opened to the outside of the case 12 and is also provided with a piezo element 18 located so as to face the ejection opening 17. In the inkjet head 10, the piezo element 18 is vibrated to eject the ink in the ejection portion 16 toward the inorganic substrate W (see FIG. 2) from the ejection opening 17. The electroconductive ink disclosed herein contains the materials mixed such that the condensation suppressing effect provided by the dispersant and the precipitation suppressing effect provided by the poly(vinyl acetal) resin are exhibited appropriately. Therefore, the viscosity of the ink can be kept low for a long time. For this reason, the ink can be ejected from the ejection opening 17 with high precision, and a precise pattern (image) can be printed on the surface of the inorganic substrate W as the printing target.

(2) Firing

According to a production method disclosed herein, the inorganic substrate W having a desired pattern printed thereon is fired under a condition under which a highest firing temperature is 1200° C. or higher (preferably, 1200° C. to 2000° C., and more preferably 1300° C. to 1600° C.). With such an arrangement, the organic solvent is evaporated, the dispersant and the resin material such as the poly(vinyl acetal) resin or the like are burned out, and also the inorganic powder is fixed to the surface of the inorganic substrate W to form an electroconductive circuit pattern. The electroconductive ink disclosed herein contains a high melting point metal material having a melting point of 1200° C. or higher, and therefore, can prevent the shape of the electroconductive circuit pattern from being destroyed by the inorganic powder being melted during the firing. For this reason, a plasma-durable electronic component (electrostatic chuck or the like) to be fired at a high temperature can be produced appropriately with the electroconductive ink disclosed herein.

TEST EXAMPLES

Hereinafter, test example according to the present invention will be described. The test examples are not intended to limit the present invention.

1. Test 1

Thirty-one types of inkjet ink (examples 1 through 31) each containing inorganic powder, a dispersant, an organic solvent and a poly(vinyl acetal) resin were prepared. Specifically, a slurry of the materials mixed as shown in Table 1 was prepared, and pulverizing beads (zirconia beads each having a diameter of 0.5 mm) were used to perform a pulverization and dispersion process. As a result, the ink in examples 1 through 31 was obtained. The materials used in each of the examples will be described below.

(Inorganic Powder)

As the inorganic powder, palladium particles (melting point: 1552° C.; specific gravity: 12.0) were used. In this test, the average primary particle diameter, the specific surface area, and the amount (% by volume) of the palladium particles were made different among examples 1 through 31 as shown in Table 1.

(Dispersant)

As the dispersant, a cationic fatty acid amine-based dispersant (Hypermer KD1 produced by Croda Japan Kabushiki Kaisha) was used. In this test, the amount of the dispersant (% by volume) was adjusted in each of examples 1 through 31 such that the ratio ($S_f/V_D$) of the specific surface area ($S_f$) of the inorganic powder material with respect to the volume ($V_D$) of the dispersant would be different among the examples.

(Organic Solvent)

As the organic solvent, butyl diglycol acetate (BDGA) produced by Daicel Corporation was used. In this test, the weight ($W_S$) of the organic solvent was set to 30 g in each of the examples.

(Poly(Vinyl Acetal) Resin)

As the poly(vinyl acetal) resin, a poly(vinyl butyral) resin (S-LEC series produced by Sekisui Chemical Co., Ltd.) was used. In this test, a plurality of types of poly(vinyl buryral) resins having different degrees of polymerization were mixed such that the average molecular weight of the poly(vinyl butyral) resin would be different in the range of $2.3 \times 10^4$ to $6.6 \times 10^4$ among the examples as shown in Table 1.

In this test, the amount (% by volume) of the poly(vinyl butyral) resin was adjusted in each of examples 1 through 30 such that the ratio ($W_{PA}/W_S$) of the weight ($W_{PA}$) of the poly(vinyl butyral) resin with respect to the weight ($W_S$) of the organic solvent would be different among the examples. In this test, electroconductive ink with no poly(vinyl butyral) resin (amount=0% by weight) was also prepared (example 31).

<Evaluation Tests>

(1) Ease of Ejection

An inkjet device (material printer DMP-2831 produced by FUJIFILM Corporation) was used to print the ink of each example in the form of a film on a surface of an inorganic substrate (formed of alumina) under ejection conditions of 10 pl/dot and 1200 dpi. The state of ejection was visually observed by use of a camera attached to the inkjet device. A case where the ink was ejected in a straight line from the ejection opening toward the inorganic substrate was evaluated as "⊚", a case where the ink was ejected from the ejection opening was evaluated as "○", and a case where the ink was not ejected from the ejection opening was evaluated as "X". The evaluation results are shown in Table 1.

(2) Adhering Strength

A sticky note (Post-it® notes, produced by 3M) was attached to the surface of the inorganic substrate having the ink in each example adhering thereto, and then the sticky note was peeled off to visually check whether or not the sticky area had the ink adhering thereto. In this evaluation, a case where the sticky note did not have the ink adhering thereto was evaluated as "○", and a case where the sticky note had the ink adhering thereto was evaluated as "X". The evaluation results are shown in Table 1.

(3) Long-Term Stability

The ink in each example was stored in an environment of 60° C. for 2 weeks, and then a Zetasizer produced by Malvern Panalytical Ltd. was used to measure the average particle diameter based on a dynamic light scattering method. Then, the ratio of the post-test average particle diameter (D2) with respect to the average particle diameter (D1) immediately after the preparation of the ink, namely (D2/D1), was calculated. In this evaluation, a case where the ratio D2/D1 was 1.2 or lower was evaluated as "⊚", a case where the ratio D2/D1 was higher than 1.2 and 1.5 or lower was evaluated as "○", and a case where the ratio D2/D1 exceeded 1.5 was evaluated as "X". The evaluation results are shown in Table 1.

TABLE 1

| | INORGANIC POWDER | | | DISPERSANT | | POLY(VINYL ACETAL) RESIN | | Ĉ | EVALUATION TEST | | | |
|---|---|---|---|---|---|---|---|---|---|---|---|---|
| | | AVERAGE PARTICLE DIAMETER | SPECIFIC SURFACE AREA | | | AVERAGE MOLECULAR | | EASE OF EJEC- | ADHERING | LONG-TERM STABILITY | | COMPRE-HENSIVE |
| | TYPE | (nm) | ($m^2$/g) | AMOUNT (% BY VOL) | AMOUNT (% BY VOL) | $S_f/V_D$ | WEIGHT ($\times 10^4$) | $W_{PA}/W_S$ | TION | STRENGTH | D2/D1 | EVAL-UATION | EVAL-UATION |
| Ex. 1 | Pd | 300 | 2.5 | 3.1 | 0.4 | 6.3 | 5.3 | 2 | ⊚ | ○ | 1.08 | ⊚ | ○ |
| Ex. 2 | Pd | 300 | 2.5 | 3.1 | 7 | 0.4 | 5.3 | 2 | ⊚ | ○ | 1.10 | ⊚ | ○ |
| Ex. 3 | Pd | 300 | 2.5 | 3.1 | 10 | 0.3 | 5.3 | 2 | ○ | ○ | 1.40 | ○ | ○ |
| Ex. 4 | Pd | 300 | 2.5 | 3.1 | 1 | 2.5 | 3.2 | 2 | ⊚ | ○ | 1.19 | ⊚ | ○ |
| Ex. 5 | Pd | 300 | 2.5 | 3.1 | 1 | 2.5 | 6.2 | 2 | ⊚ | ○ | 1.08 | ⊚ | ○ |
| Ex. 6 | Pd | 300 | 2.5 | 3.1 | 1 | 2.5 | 4 | 2 | ⊚ | ○ | 1.12 | ⊚ | ○ |
| Ex. 7 | Pd | 300 | 2.5 | 3.1 | 1 | 2.5 | 5.3 | 1 | ⊚ | ○ | 1.03 | ⊚ | ○ |
| Ex. 8 | Pd | 300 | 2.5 | 3.1 | 1 | 2.5 | 5.3 | 2 | ⊚ | ○ | 1.01 | ⊚ | ○ |
| Ex. 9 | Pd | 300 | 2.5 | 3.1 | 1 | 2.5 | 5.3 | 3 | ⊚ | ○ | 1.02 | ⊚ | ○ |
| Ex. 10 | Pd | 300 | 2.5 | 4.9 | 1.6 | 1.6 | 5.3 | 1 | ⊚ | ○ | 1.14 | ⊚ | ○ |
| Ex. 11 | Pd | 300 | 2.5 | 6.4 | 2.1 | 1.2 | 5.3 | 1 | ⊚ | ○ | 1.15 | ⊚ | ○ |

TABLE 1-continued

| | | INORGANIC POWDER | | | | | POLY(VINYL ACETAL) RESIN | | Ĉ | | | | |
|---|---|---|---|---|---|---|---|---|---|---|---|---|---|
| | | AVERAGE PARTICLE DIAMETER (nm) | SPECIFIC SURFACE AREA (m²/g) | AMOUNT (% BY VOL) | DISPERSANT AMOUNT (% BY VOL) | $S_I/V_D$ | AVERAGE MOLECULAR WEIGHT (×10⁴) | $W_{PA}/W_S$ | EVALUATION TEST | | | | |
| | TYPE | | | | | | | | EASE OF EJECTION | ADHERING STRENGTH | LONG-TERM STABILITY D2/D1 | EVALUATION | COMPREHENSIVE EVALUATION |
| Ex. 12 | Pd | 300 | 2.5 | 3.1 | 1 | 2.5 | 5.8 | 2 | ◎ | ○ | 1.06 | ◎ | ○ |
| Ex. 13 | Pd | 300 | 2.5 | 2 | 0.6 | 4.2 | 5.3 | 1 | ◎ | ○ | 1.03 | ◎ | ○ |
| Ex. 14 | Pd | 200 | 2.5 | 3.1 | 1.5 | 1.7 | 5.3 | 2 | ◎ | ○ | 1.11 | ◎ | ○ |
| Ex. 15 | Pd | 400 | 2.5 | 3.1 | 0.75 | 3.3 | 5.3 | 2 | ◎ | ○ | 1.15 | ◎ | ○ |
| Ex. 16 | Pd | 300 | 2.5 | 3.1 | 0.2 | 12.5 | 5.3 | 2 | × | — | — | — | × |
| Ex. 17 | Pd | 300 | 2.5 | 3.1 | 1 | 2.5 | 2.3 | 0.1 | ◎ | × | 2.57 | × | × |
| Ex. 18 | Pd | 300 | 2.5 | 3.1 | 1 | 2.5 | 2.3 | 3 | ○ | ○ | 1.51 | × | × |
| Ex. 19 | Pd | 300 | 2.5 | 3.1 | 1 | 2.5 | 2.3 | 1 | ◎ | ○ | 1.84 | × | × |
| Ex. 20 | Pd | 300 | 2.5 | 3.1 | 1 | 2.5 | 2.3 | 2 | ◎ | ○ | 1.82 | × | × |
| Ex. 21 | Pd | 300 | 2.5 | 3.1 | 1 | 2.5 | 2.3 | 5 | × | ○ | 1.48 | ○ | × |
| Ex. 22 | Pd | 300 | 2.5 | 3.1 | 1 | 2.5 | 2.3 | 0.1 | ◎ | × | 1.61 | × | × |
| Ex. 23 | Pd | 300 | 2.5 | 3.1 | 1 | 2.5 | 5.3 | 5 | × | ○ | 1.08 | ◎ | × |
| Ex. 24 | Pd | 300 | 2.5 | 8.3 | 2.7 | 0.9 | 5.3 | 1 | × | ○ | 1.09 | ◎ | × |
| Ex. 25 | Pd | 300 | 2.5 | 3.1 | 1 | 2.5 | 6.6 | 0.1 | ◎ | × | 2.29 | × | × |
| Ex. 26 | Pd | 300 | 2.5 | 3.1 | 1 | 2.5 | 6.6 | 1 | × | ○ | 1.05 | ◎ | × |
| Ex. 27 | Pd | 300 | 2.5 | 3.1 | 1 | 2.5 | 6.6 | 2 | × | ○ | 1.05 | ◎ | × |
| Ex. 28 | Pd | 300 | 2.5 | 3.1 | 1 | 2.5 | 6.6 | 3 | × | ○ | 1.02 | ◎ | × |
| Ex. 29 | Pd | 300 | 2.5 | 3.1 | 1 | 2.5 | 6.6 | 5 | × | ○ | 1.06 | ◎ | × |
| Ex. 30 | Pd | 600 | 1.1 | 3.1 | 2 | 0.6 | 5.3 | 2 | × | ○ | 4.23 | × | × |
| Ex. 31 | Pd | 300 | 2.5 | 3.1 | 1 | 2.5 | — | 0 | ◎ | × | 3.80 | × | × |

As shown in Table 1, in examples 1 through 15, preferred results were obtained in all of the ease of ejection, the adhering strength and the long-term stability. From this, it has been found out that electroconductive ink that has a high ease of ejection from an inkjet device and is easily storable for a long time can be prepared by adjusting each of the average primary particle diameter of the inorganic powder, the amount (% by volume) of the inorganic powder, the ratio ($S_I/V_D$) of the specific surface area of the inorganic powder with respect to the volume of the dispersant, the average molecular weight of the poly(vinyl acetal) resin, and the ratio ($W_{PA}/W_S$) of the weight of the poly(vinyl acetal) resin with respect to the weight of the organic solvent to a value in a predetermined range.

2. Test 2

Twelve types of electroconductive ink (examples 32 through 43) were prepared under the same conditions as those of test 1 described above except that the metal particles contained in the inorganic powder was made different among the examples. Specifically, in examples 32 through 34 and examples 39 through 42, inorganic powder containing tungsten particles (melting point: 3407° C.; specific gravity: 19.3) was used. In examples 37, 38 and 43, inorganic powder containing platinum particles (melting point: 1796° C.; specific gravity: 21.5) was used. In examples 35 and 36, mixed powder of palladium particles and zirconia ($ZrO_2$) particles was used as the inorganic powder. The other conditions are as shown in Table 2.

The ease of ejection, the adhering strength and the long-term stability were evaluated for the ink in each example under the same conditions as those of Test 1. The evaluation results are shown in Table 2.

TABLE 2

| | | INORGANIC POWDER | | | | | POLY(VINYL ACETAL) RESIN | | | | | | |
|---|---|---|---|---|---|---|---|---|---|---|---|---|---|
| | | AVERAGE PARTICLE DIAMETER (nm) | SPECIFIC SURFACE AREA (m²/g) | AMOUNT (% BY VOL) | DISPERSANT AMOUNT (% BY VOL) | $S_I/V_D$ | AVERAGE MOLECULAR WEIGHT (×10⁴) | $W_{PA}/W_S$ | EVALUATION TEST | | | | |
| | TYPE | | | | | | | | EASE OF EJECTION | ADHERING STRENGTH | LONG-TERM STABILITY D2/D1 | EVALUATION | COMPREHENSIVE EVALUATION |
| Ex. 32 | W | 400 | 1.7 | 3.1 | 0.4 | 4.3 | 5.3 | 2 | ◎ | ○ | 1.04 | ◎ | ○ |
| Ex. 33 | W | 400 | 1.7 | 3.1 | 0.2 | 8.5 | 5.3 | 2 | ◎ | ○ | 1.11 | ◎ | ○ |
| Ex. 34 | W | 400 | 1.7 | 3.1 | 5 | 0.3 | 5.3 | 2 | ◎ | ○ | 1.14 | ◎ | ○ |

TABLE 2-continued

| | | INORGANIC POWDER | | | | POLY(VINYL ACETAL) RESIN | | | EVALUATION TEST | | | | |
|---|---|---|---|---|---|---|---|---|---|---|---|---|---|
| | TYPE | AVERAGE PARTICLE DIAMETER (nm) | SPECIFIC SURFACE AREA (m²/g) | AMOUNT (% BY VOL) | DISPERSANT AMOUNT (% BY VOL) | $S_I/V_D$ | AVERAGE MOLECULAR WEIGHT (×10⁴) | $W_{PA}/W_S$ | EASE OF EJECTION | ADHERING STRENGTH | LONG-TERM STABILITY D2/D1 | LONG-TERM STABILITY EVALUATION | COMPREHENSIVE EVALUATION |
| Ex. 35 | Pd + ZrO2 (ZrO₂ = 2.8 wt %) | 300 | 2.5 | 3.1 | 1 | 2.5 | 5.3 | 2 | ◎ | ○ | 1.05 | ◎ | ○ |
| Ex. 36 | Pd + ZrO2 (ZrO₂ = 8.4 wt %) | 300 | 2.5 | 3.1 | 1 | 2.5 | 5.3 | 2 | ◎ | ○ | 1.07 | ◎ | ○ |
| Ex. 37 | Pt | 250 | 4.6 | 2 | 1.7 | 2.7 | 5.3 | 1 | ◎ | ○ | 1.20 | ◎ | ○ |
| Ex. 38 | Pt | 250 | 4.6 | 2 | 1.7 | 2.7 | 6.6 | 1 | ○ | ○ | 1.15 | ◎ | ○ |
| Ex. 39 | W | 400 | 1.7 | 3.1 | 0.4 | 4.3 | 2.3 | 2 | ◎ | ○ | 1.51 | × | × |
| Ex. 40 | W | 400 | 1.7 | 3.1 | 0.4 | 4.3 | 6.6 | 2 | × | ○ | 1.07 | ◎ | × |
| Ex. 41 | W | 400 | 1.7 | 3.1 | 0.1 | 17.0 | 5.3 | 2 | × | — | — | — | × |
| Ex. 42 | W | 400 | 1.7 | 3.1 | 10 | 0.2 | 5.3 | 2 | × | — | — | — | — |
| Ex. 43 | Pt | 250 | 4.6 | 2 | 1.7 | 2.7 | 2.3 | 1 | ◎ | ○ | 1.51 | × | × |

As shown in Table 2, in examples 32 through 38, preferred results were obtained in the ease of ejection, the adhering strength and the long-term stability. From this, it has been found out that the effect of the technology disclosed herein may be exhibited appropriately even in the case where a high melting point metal material other than palladium is used or in the case where mixed powder containing ceramic particles is used.

3. Test 3

Three types of electroconductive ink (examples 44 through 46) were prepared under the same conditions as those of test 1 described above except that the materials of the dispersant and the organic solvent were different from those in test 1. Specifically, in examples 44 through 46, an anion-based dispersant (BYK LP C-22124 produced by BYK-Chemie Japan Kabushiki Kaisha) was used as the dispersant. As the organic solvent, 2-octanol (produced by Showa Kagaku Kabushiki Kaisha) was used. The other conditions are as shown in Table 3. In test 3, the ease of ejection, the adhering strength and the long-term stability were evaluated under the same conditions as those of Test 1. The evaluation results are shown in Table 3.

TABLE 3

| | | INORGANIC POWDER | | | | POLY(VINYL ACETAL) RESIN | | | EVALUATION TEST | | | | |
|---|---|---|---|---|---|---|---|---|---|---|---|---|---|
| | TYPE | AVERAGE PARTICLE DIAMETER (nm) | SPECIFIC SURFACE AREA (m²/g) | AMOUNT (% BY VOL) | DISPERSANT AMOUNT (% BY VOL) | $S_I/V_D$ | AVERAGE MOLECULAR WEIGHT (×10⁴) | $W_{PA}/W_S$ | EASE OF EJECTION | ADHERING STRENGTH | LONG-TERM STABILITY D2/D1 | LONG-TERM STABILITY EVALUATION | COMPREHENSIVE EVALUATION |
| Ex. 44 | Pd | 300 | 2.5 | 3.1 | 1.1 | 2.3 | 4 | 2 | ◎ | ○ | 1.18 | ◎ | ○ |
| Ex. 45 | Pd | 300 | 2.5 | 3.1 | 1.1 | 2.3 | 1.9 | 2 | ◎ | ○ | 1.76 | × | × |
| Ex. 46 | Pd | 300 | 2.5 | 3.1 | 1.1 | 2.3 | 11 | 2 | × | ○ | 1.15 | ◎ | × |

As shown in Table 3, in example 44, preferred results were obtained in the ease of ejection, the adhering strength and the long-term stability. From this, it is expected that the technology disclosed herein allows various materials to be used for the dispersant and the organic solvent with no specific limitation.

Specific examples of the present invention have been described so far. These examples are merely illustrative, and do not limit the scope of the claims in any way. The technology in the scope of the claims encompasses various alterations and modifications of the above-described specific examples.

REFERENCE SIGNS LIST

1 Inkjet device
10 Inkjet head
12 Case
13 Storage portion
15 Liquid feeding path
16 Ejection portion
17 Ejection opening
18 Piezo element
20 Guide shaft
40 Printing cartridge
100 Stirring and pulverization device
110 Supply opening
120 Stirring container
132 Stirring blade
134 Shaft
140 Filter
150 Discharge opening

The invention claimed is:

1. Electroconductive inkjet ink usable to produce an electronic component, the electroconductive inkjet ink comprising:
    an inorganic powder containing metal particles having a melting point of 1200° C. or higher, a dispersant, an organic solvent, and a poly(vinyl acetal) resin, wherein:
    the inorganic powder has an average primary particle diameter of 500 nm or less, a volume ratio of the inorganic powder is 7.5% by volume or lower with respect to 100% by volume as the total volume of the inkjet ink,
    the ratio ($S_I/V_D$) of the specific surface area ($S_I$) of the inorganic powder with respect to the volume ($V_D$) of the dispersant where the total volume of the inkjet ink is 100% by volume is 0.25 or higher and 10 or lower,
    the poly(vinyl acetal) resin has an average molecular weight of $2.5 \times 10^4$ or larger and $6.4 \times 10^4$ or smaller,
    the ratio ($W_{PA}/W_S$) of the weight ($W_{PA}$) of the poly(vinyl acetal) resin with respect to the weight ($W_S$) of the organic solvent is 0.5% by weight or higher and 3% by weight or lower, and
    the metal particles contain at least one element selected from the group consisting of tungsten (W), platinum (Pt), and molybdenum (Mo).

2. The electroconductive inkjet ink according to claim 1, wherein the average primary particle diameter of the inorganic powder is 150 nm or more.

3. The electroconductive inkjet ink according to claim 1, wherein a volume ratio of the inorganic powder is 1.5% by volume or higher with respect to 100% by volume as the total volume of the inkjet ink.

4. The electroconductive inkjet ink according to claim 1, wherein the poly(vinyl acetal) resin is a poly(vinyl butyral) resin and/or a poly(vinyl formal) resin.

5. The electroconductive inkjet ink according to claim 1, wherein a weight ratio of the metal particles is 50% by weight or higher with respect to 100% by weight as the total weight of the inorganic powder.

6. The electroconductive inkjet ink according to claim 2, wherein a volume ratio of the inorganic powder is 1.5% by volume or higher with respect to 100% by volume as the total volume of the inkjet ink.

7. The electroconductive inkjet ink according to claim 2, wherein the poly(vinyl acetal) resin is a poly(vinyl butyral) resin and/or a poly(vinyl formal) resin.

8. The electroconductive inkjet ink according to claim 3, wherein the poly(vinyl acetal) resin is a poly(vinyl butyral) resin and/or a poly(vinyl formal) resin.

9. The electroconductive inkjet ink according to claim 2, wherein a weight ratio of the metal particles is 50% by weight or higher with respect to 100% by weight as the total weight of the inorganic powder.

10. The electroconductive inkjet ink according to claim 3, wherein a weight ratio of the metal particles is 50% by weight or higher with respect to 100% by weight as the total weight of the inorganic powder.

11. The electroconductive inkjet ink according to claim 4, wherein a weight ratio of the metal particles is 50% by weight or higher with respect to 100% by weight as the total weight of the inorganic powder.

* * * * *